United States Patent
Birchall et al.

(10) Patent No.: US 10,515,081 B2
(45) Date of Patent: Dec. 24, 2019

(54) USER-AWARE NOTIFICATION DELIVERY

(71) Applicant: Facebook, Inc., Menlo Park, CA (US)

(72) Inventors: Andrew Alexander Birchall, San Francisco, CA (US); Aleksandar Ilic, Los Altos, CA (US); Florin Ratiu, Mountain View, CA (US); Martin Rehwald, Mountain View, CA (US); Yiyu Li, Mountain View, CA (US); Pradeep Kumar Sharma, Santa Clara, CA (US); Vasanth Kumar Rajendran, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 92 days.

(21) Appl. No.: 14/567,218

(22) Filed: Dec. 11, 2014

(65) Prior Publication Data

US 2016/0170991 A1    Jun. 16, 2016

(51) Int. Cl.
*G06F 17/30* (2006.01)
*G06F 16/2457* (2019.01)
*H04L 29/08* (2006.01)

(52) U.S. Cl.
CPC .... *G06F 16/24578* (2019.01); *H04L 67/1076* (2013.01)

(58) Field of Classification Search
CPC ... H04L 51/24; G06F 16/24578; G06F 21/552
(Continued)

(56) References Cited

U.S. PATENT DOCUMENTS 7,209,916 B1 *  4/2007  Seshadri .......... G06F 17/30867
2002/0072980 A1  6/2002  Dutta
(Continued)

FOREIGN PATENT DOCUMENTS

| EP | 2744158 A1 | 6/2014 |
| JP | 2013211609 A | 10/2013 |
| WO | WO 2014093997 A1 | 6/2014 |

OTHER PUBLICATIONS

European Search Report for EP Application No. 15171495.3, dated Sep. 23, 2015.
(Continued)

*Primary Examiner* — Hung T Vy
(74) *Attorney, Agent, or Firm* — Baker Botts L.L.P.

(57) ABSTRACT

In one embodiment, a method includes one or more computing devices accessing a notification to be sent to a user, where the notification has a context. The method also includes one or more computing devices sending a request to a history service for historical notification data associated with the user with respect to the context of the notification and a ranking of the notification where the ranking indicates a probability of the user interacting with the notification. The method also includes one or more computing devices receiving the historical notification data and the ranking from the history service. Moreover, the method also includes one or more computing devices determining a notification policy to apply to the notification based at least in part on the context of the notification, the historical notification data, and the ranking. Furthermore, the method also includes one or more computing devices applying the notification policy to the notification to be sent to the user.

18 Claims, 6 Drawing Sheets

(58) Field of Classification Search
USPC .......................................... 707/751; 709/207
See application file for complete search history.

(56) References Cited

U.S. PATENT DOCUMENTS

| | | | |
|---|---|---|---|
| 2004/0030753 A1* | 2/2004 | Horvitz | G05B 19/404 |
| | | | 709/206 |
| 2004/0193688 A1* | 9/2004 | McKee | G06F 9/451 |
| | | | 709/206 |
| 2008/0086431 A1 | 4/2008 | Robinson | |
| 2011/0173068 A1 | 7/2011 | O'Hanlon | |
| 2013/0097238 A1 | 4/2013 | Rogers | |
| 2013/0102287 A1 | 4/2013 | Toksvig | |
| 2013/0166726 A1* | 6/2013 | Boldyrev | G06Q 50/01 |
| | | | 709/224 |
| 2014/0129661 A1* | 5/2014 | Thyagaraja | G06F 9/542 |
| | | | 709/207 |
| 2014/0213241 A1 | 7/2014 | Altintas | |
| 2014/0325562 A1 | 10/2014 | Beattie | |

OTHER PUBLICATIONS

International Search Report and Written Opinion from International Application No. PCT/US2014/070449, dated Sep. 7, 2015.
Communication, European Patent Office, Application No. 15 171 495.3, dated Feb. 14, 2018.
MX Office Action received for Patent Application No. MX/a/2017/007644. (with English Translation), dated Oct. 15, 2018.
JP Office Action received from JPO for Patent Application No. 2017-531223. (with English Translation), dated Dec. 17, 2018.
EP Communication received from EPO for Patent Application No. 15171495.3, dated Jul. 23, 2019.
IL Office Action received from ILPO for Patent Application No. 252614. (with English Translation), dated Jun. 11, 2019.
JP Office Action received from JPO for Patent Application No. 2017-531223. (with English Translation), dated Jun. 18, 2019.

* cited by examiner

USER-AWARE NOTIFICATION DELIVERY

TECHNICAL FIELD

This disclosure generally relates to delivering notifications to a user.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a notification system may deliver notifications to a user in a user-aware manner. Such notifications may be sent through one or more delivery channels, e.g., sent by one or more communication media (e.g., SMS, MMS, email, application, voice) to one or more unique endpoints (e.g., a telephone number, an email address, a particular client device as specified by a unique device identifier). In particular embodiments, the notification system may utilize different techniques to attempt to provide a notification to a user in a manner that increases the likelihood that the user will interact with the notification (e.g., a "click-through" action whereby the user clicks on a link presented in a visual notification presenting promotional content, which then brings up a third-party website on the user's screen), which hopefully increases the likelihood that a "conversion" takes place—that the user takes some final action that is the ultimate goal of delivering the notification (e.g., completes an action, such as a registration, content consumption, or a purchase, on the third-party website). In particular embodiments, elements of the notification system may be implemented as part of a social-networking system. In particular embodiments, elements of the notification system may be implemented as part of a third-party system.

In particular embodiments, a policy engine of the notification system may assess a number of different factors in order to determine delivery instructions for a notification. For any particular notification, the policy engine may assess not only (1) information associated with the notification (e.g., the source, the content, or the format) and (2) information associated with a particular user (e.g., demographic information for the user, the user's location, the user's available delivery channels and the status thereof, the user's current delivery context, user profile information, or social-networking information for the user), but also (3) historical notification information about this particular user's responses to past notifications (e.g., conversion rates for different notification/context/delivery patterns) and about prior context/delivery patterns (if any) for the current notification (and interaction levels, if any, for those prior context/delivery patterns).

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
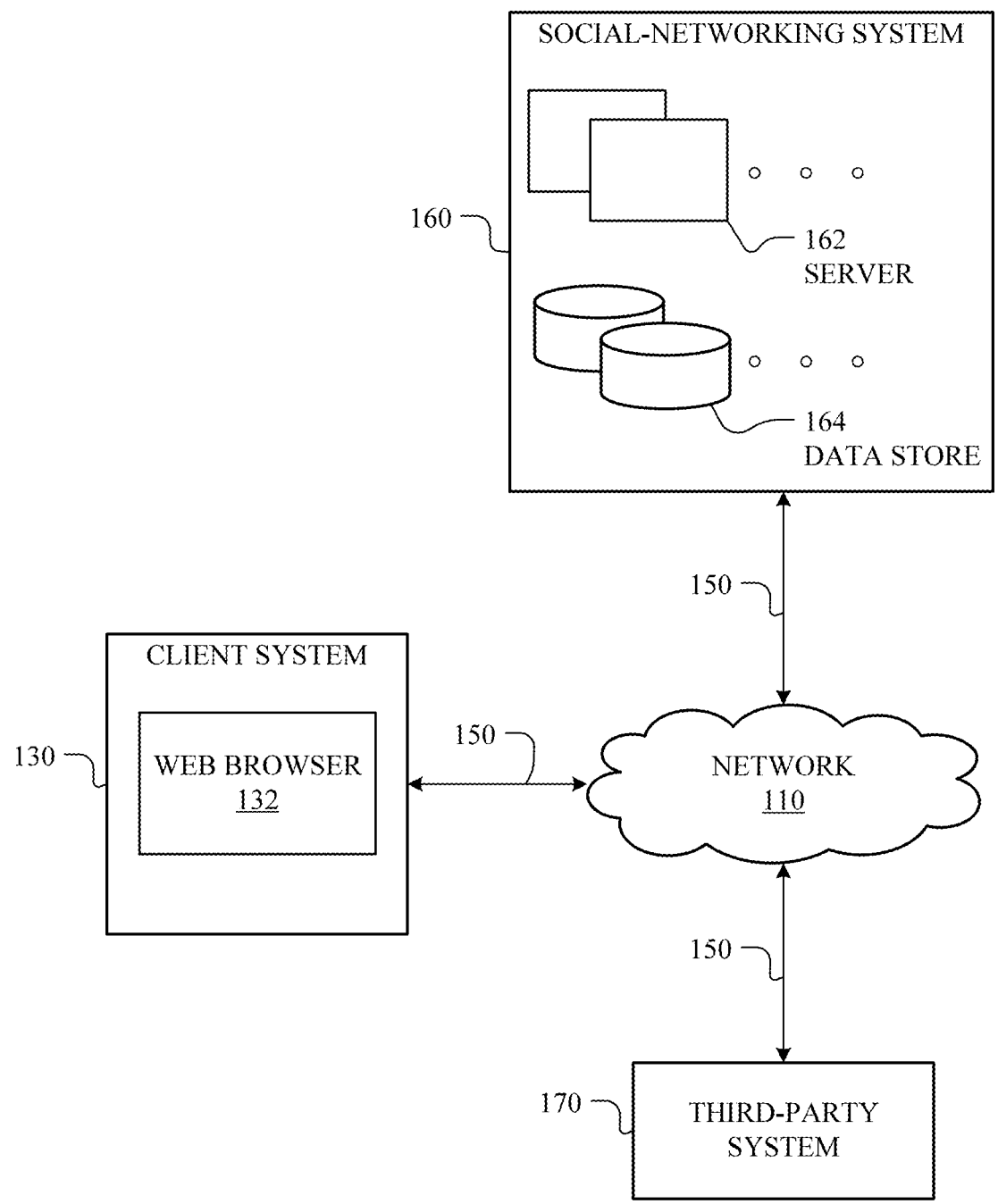
FIG. 1A illustrates an example network environment associated with a social-networking system.

In particular embodiments, a notification system may deliver notifications to a user in a user-aware manner. Such notifications may be sent through one or more delivery channels, e.g., sent by one or more communication media (e.g., SMS, MMS, email, application, voice) to one or more unique endpoints (e.g., a telephone number, an email address, a particular client device as specified by a unique device identifier). In particular embodiments, the notification system may utilize different techniques to attempt to provide a notification to a user in a manner that increases the likelihood that the user will interact with the notification (e.g., a "click-through" action whereby the user clicks on a link presented in a visual notification presenting promotional content, which then brings up a third-party website on the user's screen), which hopefully increases the likelihood that a "conversion" takes place—that the user takes some final action that is the ultimate goal of delivering the notification (e.g., completes an action, such as a registration, content consumption, or a purchase, on the third-party website).

In particular embodiments, a policy engine of the notification system may assess a number of different factors in order to determine delivery instructions for a notification. For any particular notification, the policy engine may assess not only (1) information associated with the notification (e.g., the source, the content, or the format) and (2) information associated with a particular user (e.g., demographic information for the user, the user's location, the user's available delivery channels and the status thereof, the user's current delivery context, user profile information, or social-networking information for the user), but also (3) historical notification information about this particular user's responses to past notifications (e.g., conversion rates for different notification/context/delivery patterns) and about prior context/delivery patterns (if any) for the current notification (and interaction levels, if any, for those prior context/delivery patterns).

In particular embodiments, a history service of the notification system may collect and analyze the user's responses to past notifications in order to determine the user's level of interaction (if any) with the past notifications. Information about the user's responses to past notifications may be stored in a historical notification data store. The type of historical data collected about a past notification may include, by way of example and not limitation: the notification content and format, the source of the notification, the date and time when the past notification was delivered to the user, the delivery channel(s) to which the notification was sent, whether the notification was successfully delivered to the delivery channel(s) (and attempted context/delivery patterns), or information about a subsequent completed transaction (wherein the completed transaction is associated with the past notification), including time-to-completion.

Using such historical data, the history service may also rank, by their conversion scores, different aspects of the notification/context/delivery patterns for past notifications sent to a particular user, such as, by way of example and not limitation: delivery channels, notification content types, notification sources, delivery contexts, or delivery patterns. In particular embodiments, the history service may compute the ranking of conversion scores by combining together two sets of data, for example, the average conversion score for a particular delivery channel at a first time after delivery of the notification (e.g., 3 hours after delivery) and the average conversion score for a particular delivery channel at a second time after delivery of the notification (e.g., 36 hours after delivery). Taking a global view of such historical data, the history service may also rank, by their conversion scores, different aspects of the notification/context/delivery patterns for past notifications across all users.

As information about user interactions with notifications sent to the user are sent back to the notification system, the history service may continuously update the historical notification data based on received information, so as to provide the policy engine with the most up-to-date information about past user interactions. In some embodiments, the history service may also maintain a decision-tree model, based on the historical notification data, for determining delivery instructions for a current notification. The decision-tree model itself may be initially constructed using a machine-learning algorithm, based on a set of training data and/or a pre-existing set of historical data.

In particular embodiments, a registration service of the notification system may collect and store information sent by a device of the user upon enabling a new delivery channel (a communication medium-endpoint combination). For example, if the user installs a software application on their computing device through which notifications may be delivered, the application may send registration information back to the registration service indicating that a new delivery channel is now available for this particular user—that a new communication medium (e.g., the application) is available for a particular endpoint (e.g., the computing device). Such registration information may be provided in the form of a registration token identifying the user, the installed instance, and the computing device. The registration information about the user's available delivery channels may then be provided to the policy engine for use when determining the delivery policy to be applied to a particular notification. Information about the user's available delivery channels may be stored in a registration data store. The registration data may include, by way of example and not limitation: a unique identifier for the endpoint, features and capabilities of the endpoint (e.g., audio-visual specifications, battery capacity, or network connectivity specifications), a unique identifier for the communication medium, features and capabilities of the communication medium (e.g., maximum message size, data transfer allotment, or maximum bandwidth), or a unique identifier for the installed instance of the software application.

By assessing information such as that described above, the policy engine may generate a delivery policy for the notification. The delivery policy may provide instructions for a notification delivery service to deliver the notification in accordance with a specified context/delivery pattern. The context/delivery pattern may provide instructions regarding when to send the notification (e.g., day, time, ideal delivery context), how to send the notification (e.g., which delivery channels should be utilized), a maximum duration beyond which the notification should be re-delivered, when and how to re-deliver the notification in the absence of user interaction and/or successful conversion, or whether to deliver the notification in light of (1) the information associated with the notification, (2) the information associated with a particular user, and (3) the historical notification information.

Actual delivery of the notification may be handled by a notification delivery service, which receives the notification and the delivery policy. The notification delivery service may generate an appropriate form of the notification for delivery through the selected delivery channel(s). The notification delivery service may schedule the notification for delivery at a specified time and day, for delivery upon detecting a particular user delivery context (e.g., upon detecting that the user has begun actively using their mobile device; upon determining, based on the user's calendar information, that the user should be available; upon determining that the user's location has changed; or upon determining that the user has moved within a threshold proximity to one or more social-networking contacts of the user).

Information about user interactions with the notification may be sent back to a response-handling service by way of the same delivery channel by which the related notification was delivered. Such information may include, for example, and without limitation: whether the user ever actively opened the notification (including, e.g., how many times the user actively opened the notification), user attention level with respect to the opened notification (including, e.g., how many times the user viewed or listened to the notification, how long the user paid attention on each occasion, and the user's delivery context on each occasion), whether the user clicked on a link in the notification, or whether the user provided feedback regarding the notification (e.g., clicking to "Like" or rate the notification, or commenting on the notification). Such information may also factor in negative feedback, such as, for example, and without limitation: whether the user dismissed the notification without opening it, whether the user subsequently blocked notifications from the source of the notification, whether the user subsequently disabled push notifications, whether the user subsequently logged out of the application, or whether the user subsequently unsubscribed from receiving certain email notifications. Other factors may be considered when computing a conversion success rate, such as: comparison as against an expected level of interaction, comparison as against an average level of interaction, the duration of time between delivery of the notification and the user interaction with the notification, delivery patterns leading to the interaction, or the number and/or pattern of lower-level interactions leading up to a higher-level interaction). A conversion success rate may be determined based on a target user interaction (e.g., in some cases, the ultimate goal of a notification may be to cause the user to open and view the full text of the notification, whereas, in other cases, the ultimate goal of a notification may be to motivate the user to click on a link in the notification and then complete a purchase, download, or registration on a third-party website). The response-handling service may then forward the user interaction information to the history service, which may collect and analyze the user's responses to past notifications, as described above.

FIG. 1A illustrates an example network environment 100 associated with a social-networking system. Network environment 100 includes a client system 130, a social-networking system 160, and a third-party system 170 connected to each other by a network 110. Although FIG. 1A illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1A illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 1B:
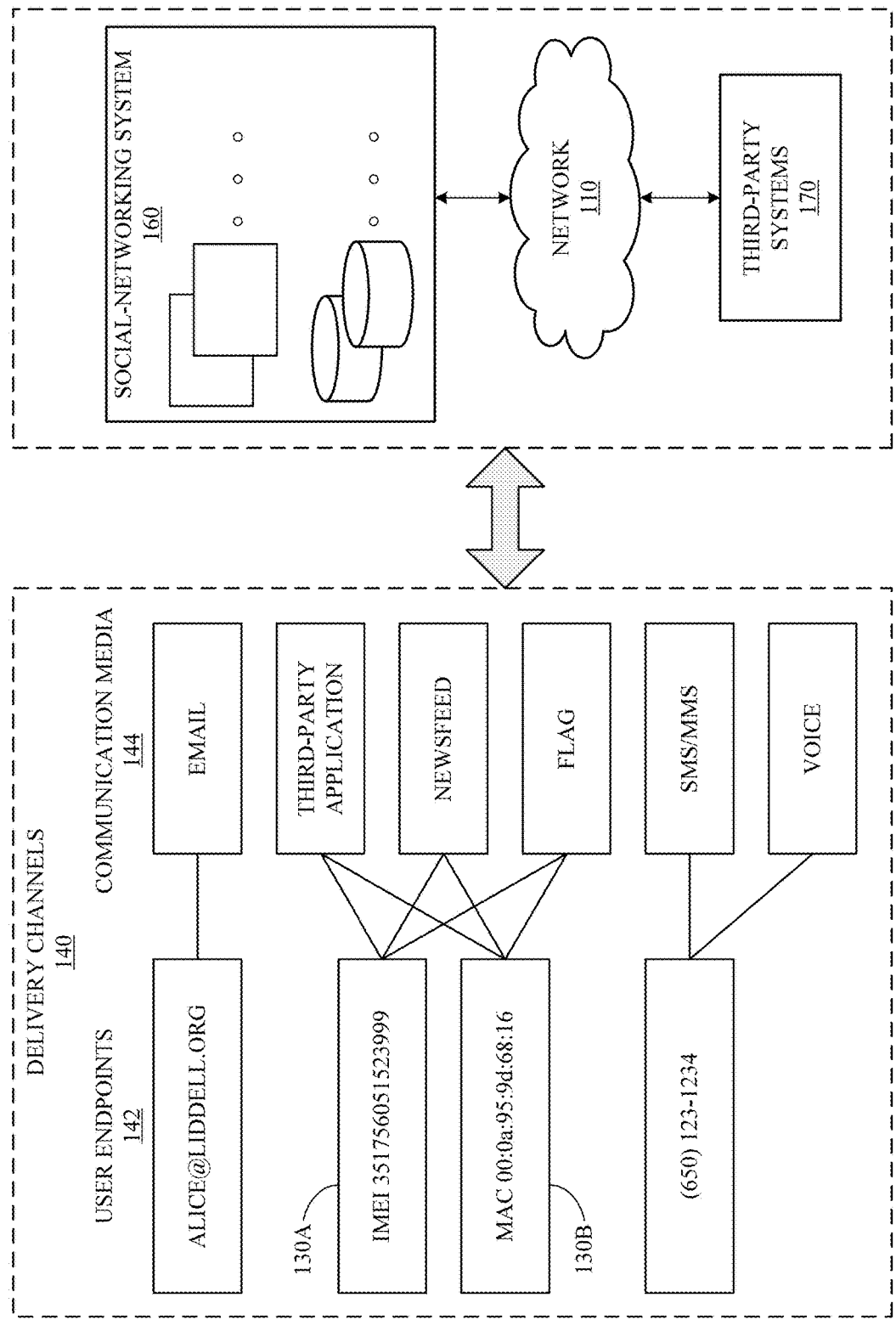
FIG. 1B illustrates an example architecture for delivering notifications to a user.

FIG. 1B illustrates an example architecture for delivering notifications to a user (Alice Liddell). In one example embodiment described herein, elements of the notification system may be implemented as part of a social-networking system, and the notification system may handle delivery of notifications generated by third-party systems as well as by the social-networking system itself. In particular embodiments, elements of the notification system may be implemented as part of a third-party system.

As shown in FIG. 1B, notifications may be delivered by way of a number of different delivery channels 140. As discussed above, a delivery channel 140 may comprise one or more uniquely-identified endpoint 142 and one or more communication media 144. As shown in FIG. 1B, notifications may be delivered by one or more communication media (e.g., SMS, MMS, email, application, voice, newsfeed, flag) to one or more unique endpoints (e.g., a telephone number, an email address, a particular client device as specified by a unique device identifier). In some embodiments, a particular communication media may be able to deliver a notification to more than one endpoint—for example, a third-party application such as SNAPCHAT may be installed on the user's smartphone client device 130A and also on the user's laptop 130B. Communication media may be a push-type medium, such as SMS or email, or it may be a pull-type medium, such as newsfeed.

In particular embodiments, the notification system may select different delivery channels for notifications based on the user's available delivery channels and the status thereof. As discussed above, the information about the user's available delivery channels may be retrieved from the registration data store (e.g., information to enable the notification system to deliver the notification to a SNAPCHAT application). The notification system may also select different delivery channels for notifications based on the user's current delivery context, which may include device status. For example, if Alice's smartphone is currently placed in Silent mode, and she just checked in at a movie theater with her friends, then delivery of any notifications may be delayed until movement detected by the phone indicates that she is exiting the theater. The notification system may also choose to "escalate" a notification from a lower-ranked delivery channel (e.g., newsfeed) to a higher-ranked delivery channel (e.g., SMS) when re-delivering a notification, in order to increase the likelihood that the receiving user will interact with the notification. Further examples and use cases are discussed herein with respect to FIG. 3.

Figure 2:
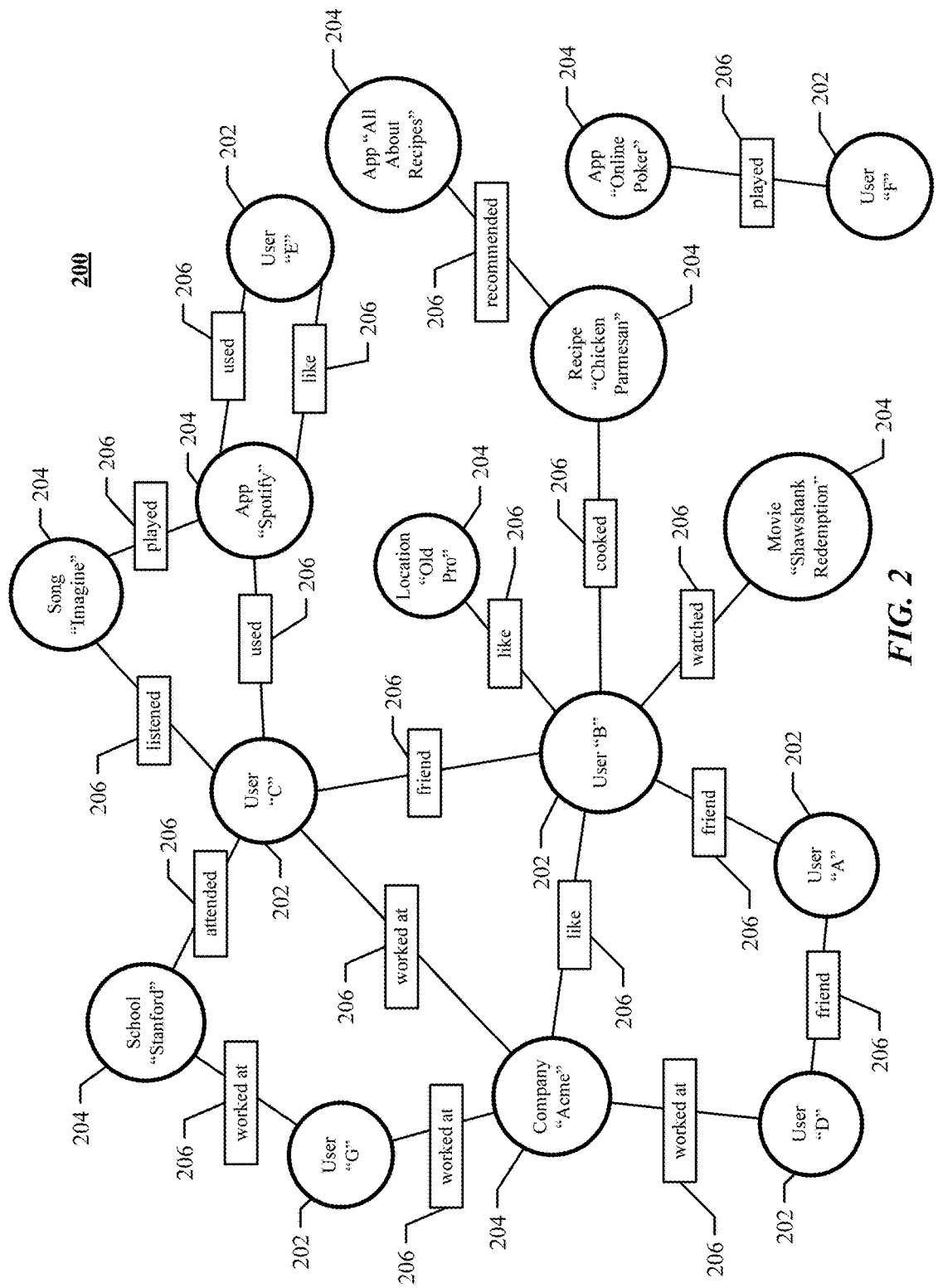
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity)

for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3:
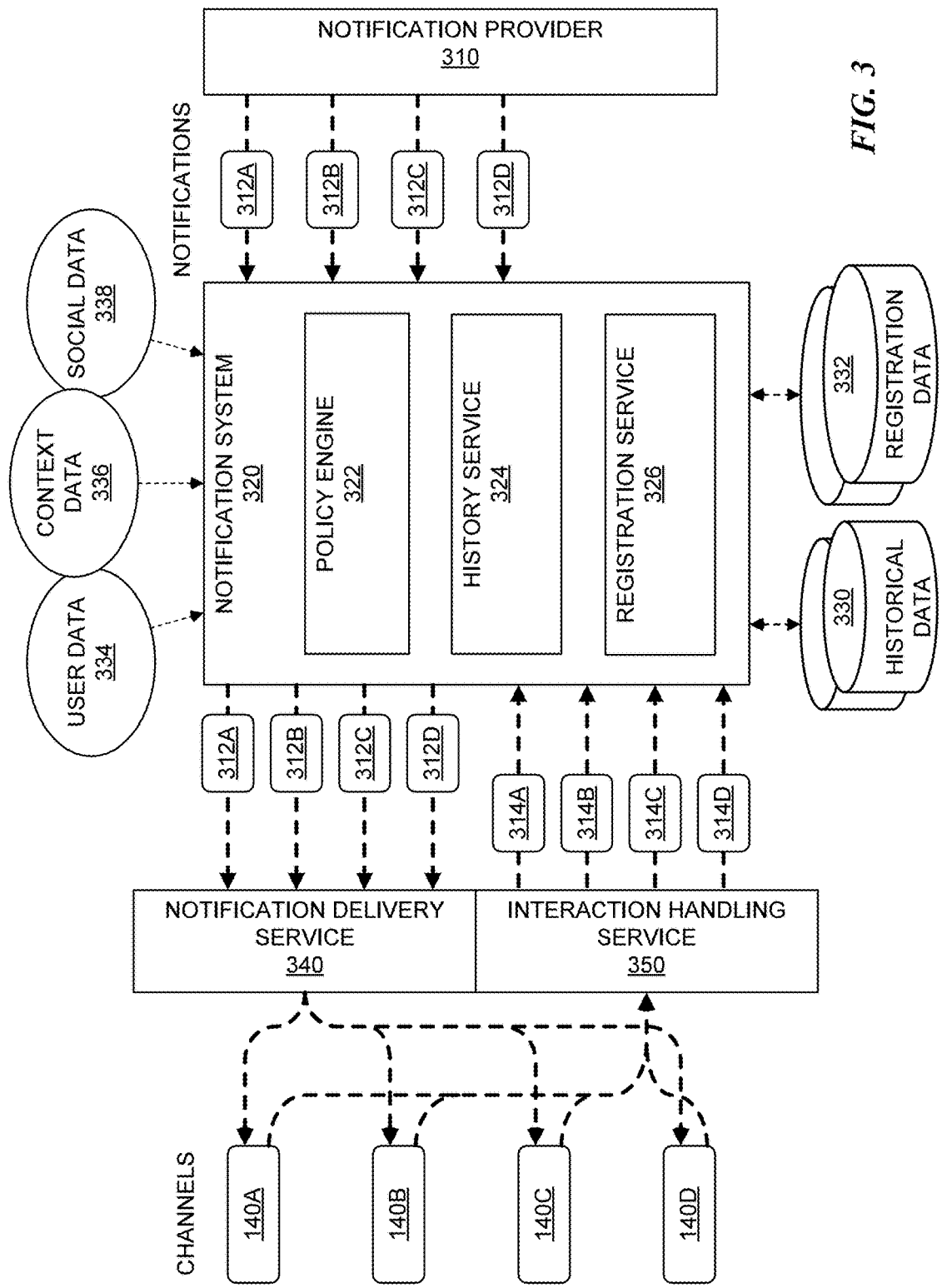
FIG. 3 illustrates an example embodiment of a notification system.

FIG. 3 illustrates an example embodiment of a notification system 320. A notification provider 310 may provide notifications 312 for delivery. Notification provider 310 may include the social-networking system or a third-party system. In the example embodiment illustrated in FIG. 3, notifications 312 may all be targeted to the same user, yet delivered differently, due to differences in the current context, the user's social-networking information relating to the content of the notification, the user's past history of interacting with notifications sent by a particular source, etc. In particular embodiments, policy engine 322 of notification system 320 may assess information associated with the notification (e.g., the source, the content, or the format). Such information may be provided within the content of notifications 312 or as associated metadata.

In particular embodiments, the policy engine 322 may also assess information associated with a particular user (e.g., demographic information for the user, the user's location, the user's available delivery channels 140 and the status thereof, the user's current delivery context, user profile information, or social-networking information for the user). The policy engine 322 may retrieve information about the user's available delivery channels 140 from registration data store 332. Information such as the demographic information for the user, user profile information, or social-networking information for the user may be retrieved as user data 334 and social data 338. Information about the user's current delivery context may be retrieved as context data 336—this category of information may cover any aspect of the user's current delivery context, such as, by way of example and not limitation: information about: a location of the user, a calendar associated with the user, an indicated status of the user, a scheduled event associated with the location, a trajectory of the user, a device status of one or more client devices associated with the user, or the user's current location with respect to other users to whom the user is connected in their social network.

In particular embodiments, policy engine 322 may also retrieve historical notification information about this particular user's responses to past notifications (e.g., conversion rates for different notification/context/delivery patterns) and about prior context/delivery patterns (if any) for the current notification (and interaction levels, if any, for those prior context/delivery patterns) from history service 324. Once policy engine 322 has considered the relevant factors and produced a policy to be applied to notifications 312, notification delivery service 340 may handle formatting and delivering the notification in accordance with the context/delivery pattern specified in the delivery policy.

Notification delivery service 340 may generate an appropriate form of the notification for delivery through a delivery channel 140, based on the features and capabilities of the underlying medium and endpoint. The notification delivery service may schedule the notification for delivery at a specified time and day, for delivery upon detecting a particular user delivery context (e.g., upon detecting that the user has begun actively using their mobile device; upon determining, based on the user's calendar information, that the user should be available; upon determining that the user's location has changed; or upon determining that the user has moved within a threshold proximity to one or more social-networking contacts of the user).

After having delivered the notifications to delivery channels 140, user interaction data 314 may be sent back to an interaction handling service 350, which sends the user interaction data 314 on to history service 324. History service 324 of the notification system may collect and analyze the user's responses to past notifications in order to determine the user's level of interaction (if any) with the past notifications. Information about the user's responses to past notifications may be stored in historical notification data store 330.

Figure 4:
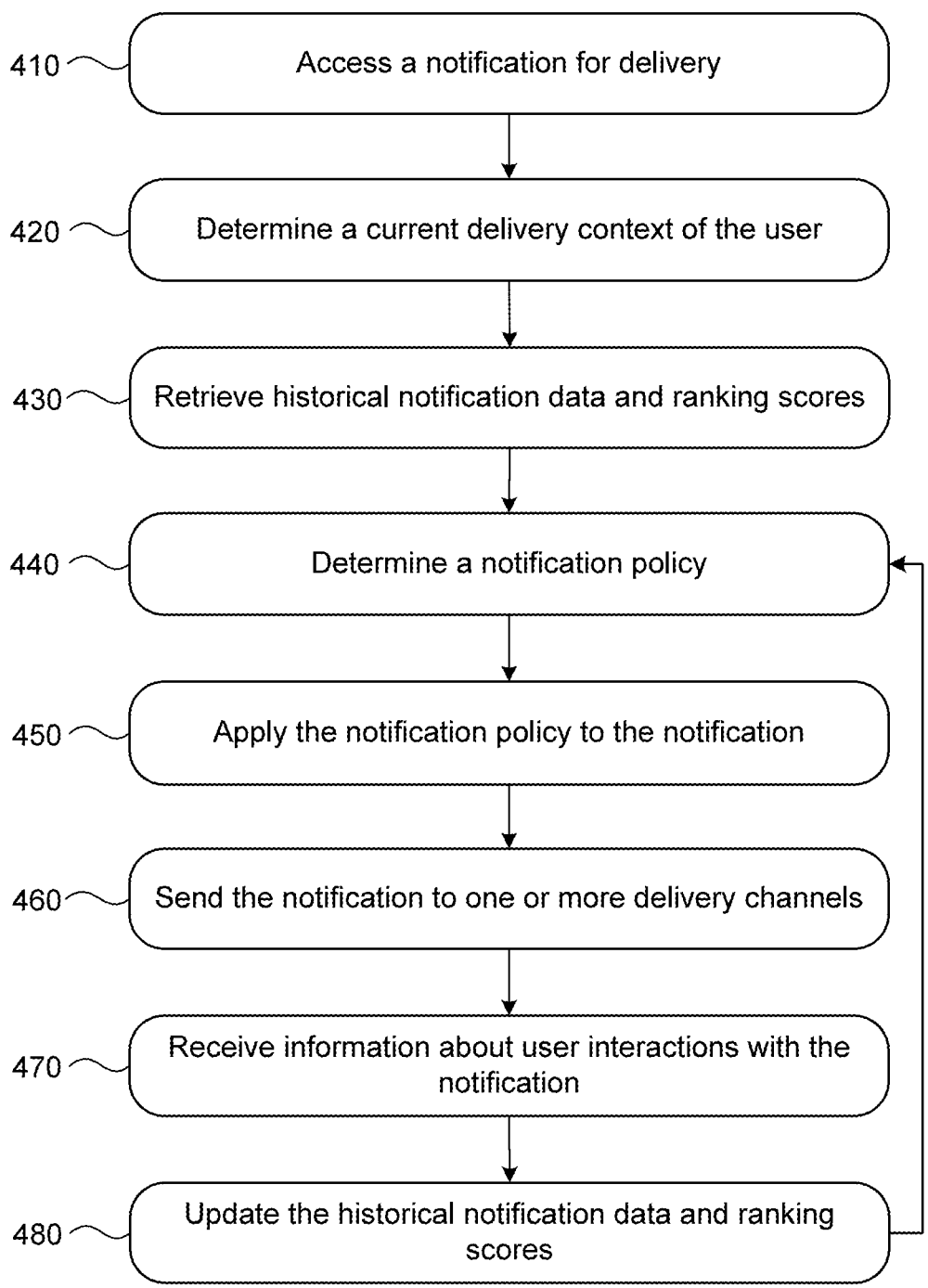
FIG. 4 illustrates an example method for handling notification delivery in a user-aware manner.

FIG. 4 illustrates an example method for handling notification delivery in a user-aware manner. In step 410, the notification system receives a notification to be delivered. For example, a social-networking message may be sent from user Alice's designated best friend on the social-networking system to Alice.

In step 420, the notification system determines information about the notification, such as (1) information associated with the notification (e.g., the source, the content, or the format) and (2) information associated with a particular user (e.g., demographic information for the user, the user's location, the user's available delivery channels and the status thereof, the user's current delivery context, user profile information, or social-networking information for the user). In this situation, the message may include buzzwords such as "hospital" and "accident." In addition, the message may be sent at 2:40 AM on a Sunday morning, and may include the name of a friend who is a first degree friend on Alice's social network. The message may also include the name of the hospital that the first degree friend is currently located at.

By retrieving information about Alice's current delivery context, the policy engine may determine that (1) the hospital is within 20 miles away from her based on a determination of her current location; (2) that she was actively using her mobile device 15 minutes prior to her best friend sending the message by the social-networking system; (3) that she typically goes to bed after 2:30 AM on Sunday mornings based on her historical activity, including pictures and posts uploaded to the social-networking website; (4) that she typically will place her phone face down on a surface prior to going to sleep (e.g., as determined by a minimum 4 hour period of inactivity of her mobile device). Based on her recent activity, historical activity, the current time being 2:40 AM, and the determination that Alice has not placed her phone face down on a surface, the policy engine may conclude that she is likely still awake (and likely to interact with the notification).

By retrieving social-networking information about Alice, the policy engine may determine that Alice, her best friend, and the first degree friend all went to high school together and live in the same neighborhood based on: her profile information and location information, her best friend's profile information and location information, the first degree friend's profile information and location information, and Alice's, best friend's and first degree friend's posts on the social-networking website. The policy engine may also determine that Alice, her designated best friend, and the first degree friend have a bunch scheduled for 11:00 AM that Sunday morning based on Alice's recent posts on the social-networking website. Thus, the policy engine may determine that Alice is very close with the first degree friend as well, and thus is more likely to respond to the message.

In step 430, the notification system retrieves historical notification data and ranking scores from the history service. The policy engine may also determine that Alice typically responds to messages sent by her designated best friend within an average of 2 minutes regardless of when the messages are sent to her based at least in part on her previous messaging data. In addition, the policy engine may determine that she typically responds to messages send after midnight within an average of 5 minutes. Thus, the policy engine may conclude that she typically responds to late night messages very quickly, and is very likely to respond to a message from her designated best friend. In addition, the policy engine may determine that she typically responds to messages sent to her mobile device on average within 10 minutes, messages sent to her laptop computer on average within 2 hours, emails to her mobile device and/or laptop computer on average within 30 minutes (and in particular, emails sent to her mobile device on average within 10 minutes), and voicemails to her mobile device within 3 hours. Thus, the policy engine may determine that she is more likely to respond to SMS messages and emails sent to her mobile device than any other endpoint.

In step 440, the notification system determines a notification policy, which is applied to the notification in step 450. In particular embodiments, certain notification types (e.g., invitations to participate in a game) may be sent to certain delivery channels (e.g., newsfeed page) but never to certain other delivery channels (e.g., SMS to her cellphone). Given the nature of the communication, the notification policy may indicate that an SMS message should be re-sent to her mobile device once every five minutes until she interacts with the notification or dismisses it. In particular embodiments, the notification policy may also indicate that a voice call should be made to her mobile device (using an automated voice) in order to leave Alice a voicemail and/or to give her an opportunity to pick up the phone and to be connected to her best friend's cellphone.

Based on these determinations, the policy engine may determine that given the urgency and importance of the request, Alice is highly likely to interact with the notification of the message and to act upon the content of the notification of the message. Therefore, given the high level of importance of the notification, the delivery context of the notification, and the historical data, the notification policy indicates that the message is to be immediately delivered by all available media to all endpoints (as in step 460). In particular embodiments, once Alice has responded in one delivery channel to a notification sent by multiple delivery channels, any unopened notifications sent to other delivery channels may be recalled or retracted.

In step 470, the notification system receives information about user interactions with the notification, and then updates the historical notification data and the conversion score rankings in step 480. As discussed in our example, once Alice views the text message and/or listens to the voicemail, information about that user interaction will be sent back to the notification system, so that the notification system is aware that it should not send the same message through the same delivery channel.

In a second example, an event invitation message may be received from a coordinator of an invitation-only dinner club group to all members of the dinner club group (step 410). In this situation, the dinner club group may be a paid membership group, of which Alice is a member. The message may indicate that La Folie is having a special classic Provençal cuisine tasting event this Saturday with guest chef Joël Robuchon, that the event includes a 12-course tasting menu and costs $350/person, and that space is limited to the first 25 people who RSVP on a first come, first served, basis.

In step 420, the notification system may determine a number of factors pertaining to her delivery context. The notification system may determine that La Folie is within 35 miles from her home location. The notification system may also determine that Alice likely owns a car based on determining that user's workplace is about 25 miles from her home location and that she is not located close to public transportation and does not usually take public transportation, which may be determined based on her location data. In addition, the notification system may determine that she posted a request for information on recommendations for local auto repair shops on the social-networking website three months ago. Thus, the notification system may determine that she owns a car, and that the 35 mile distance is a reasonable travel distance for her.

The notification system may determine that Alice is currently on a business trip in a city that is 2000 miles away from her home location based on location data and her activity on the social-networking website (e.g., she posted on the social-networking website that she will be in Chicago for a business trip for the week and inviting friends in the area out for dinner). The notification system may also determine that she is scheduled to fly back home on Friday based on her calendar and her conversations with other users on the social-networking website. Thus, the notification system may determine that although she is not currently within a reasonable travel distance given her current location determined by the social-networking system, she will be within a reasonable travel distance on the day of the special tasting event and thus will not immediately dismiss the message based on unavailability.

The notification system may also determine that Alice loves French food based at least in part on her social-networking profile, her food-related posts and pictures, her comments on other user's posts and pictures on French food, and her frequented restaurants. In particular, the notification system may determine that she has been to all French restaurants within a 60 mile radius of her home location, dines out on average three times a week for dinner, and goes to a French restaurant at least once a week for dinner, based at least in part on information collect on her location during dinnertime during the week, her posts and pictures on the social-networking system, and her credit card transaction information. In addition, the notification system may determine that whenever she travels for work, she always schedules reservations for at least one French restaurant in the area around the travel location based at least in part on her calendar information, posts and pictures uploaded to her social-networking website, and credit card transactions. Thus, the notification system may determine that she may be very interested in the special tasting event, and thus very likely to interact with the notification of such an event.

In step 430, the notification system retrieves historical notification data and ranking scores from the history service.

The notification system may determine that Alice is typically very responsive to messages sent from the dinner club group, and at least views all messages sent by the dinner club group within an average of 3 minutes after receiving the message based at least in part on her social-networking activity and general mobile device activity. As an example, and not by way of limitation, the notification system may determine that she is viewing the messages based on her interaction with the instant messenger, mail, and/or voicemail application, including opening the messenger and/or mail application, and 30 seconds to a minute of inactivity on the device (which the notification system determines to be the user viewing the message) or pressing a play button for a voicemail message. In addition, the notification system determines that she clicks on content presented in the messages at least 85% of the time, and when the content relates to French food, she clicks on content presented in the messages 100% of the time. Thus, the notification system may determine that she is very likely to interact with the notification of the special tasting event with 3-5 minutes after sending the message.

Furthermore, the notification system may determine that Alice is currently within a movie theatre based on location information, and has been at the movie theatre for two hours based on tracking and location information. In addition, the notification system may determine that she has her mobile device on silent mode, and that the mobile device is face down on a surface, based on location information, mobile device gyroscope information, and mobile device settings information. Thus, the notification system may determine that she will likely not respond to any messages sent immediately at this time. However, the notification system may determine that the movie will likely end in 20 minutes based on local movie-times data. In addition, the notification system may determine that, based on historical use data, she always checks his/her mobile device immediately after leaving a movie theatre. Thus, the notification system may determine that she will much more likely check their mobile device and interact with notifications after 20 minutes.

In step 440, based on these determinations, the notification system may determine that there is a very high likelihood that Alice will interact with the notification of the message from the coordinator of a dinner club group and act upon the content of the notification of the special tasting event, and that this notification is urgent given the time limitations associated with the content. Therefore, given the high ranking of the notification, the context of the notification, and the historical data, the notification policy indicates that the message should be delivered to the user by all available delivery channels. However, in step 450 and 460, because she is unlikely to view the notification at the current time based on her current activities, the policy may include delaying the sending of the notification to her for at least 20 minutes so that she will receive the notification after the movie has likely ended and thus will be more likely to immediately interact with the notification and act on the content of the notification. Once information indicating that the user viewed the SMS message is received (in step 470), any as-of-yet unopened emails may be recalled.

In a third example, in step 410, the notification system may receive a promotional message may be sent to a predetermined number of users (e.g., a message broadcast to a predetermined group of users) notifying them of a MAX-MARA closeout sale at a particular store location where all items are 40-70% off starting this Friday, and where the message is to be sent out this Wednesday.

In step 420, the notification system may determine that Alice visits that MAXMARA store once every week based on her location information, and usually remains at the store for at least an hour during each visit. Thus, the notification system may determine that she likes MAXMARA clothing, and would be interested in any sales going on at MAXMARA. In addition, the notification system may determine that even though she visits the MAXMARA store once a week, she only buys clothes from that store once a month based on her location information, her posts and/or pictures uploaded to the social-networking website, and her credit card information. In addition, the notification system may determine that she only buys clothing at MAXMARA once a month in part because of the high prices for the clothing. The notification system may determine that MAXMARA rarely has sales based on information from MAXMARA's website, local advertisements, and store information. Thus, the notification system concludes that she may be very interested in the closeout sale, and therefore the notification should be sent to her as soon as possible due to the limited duration of time until the sale.

In step 430, the notification system may determine that Alice rarely clicks on emails associated with advertisements based on her interaction with their email notifications. In particular, the notification system may determine that she only views and clicks through links and content presented in email notifications no more than 5% of the time. In addition, the notification system may determine that she receives on average 10 advertisement ads per hour based on a determination of the amount and type of email content she receives. Thus, the notification system may determine that emailing notifications to her may not be a very effective method to get her to interact with the notification and act upon the content of the notification. However, due to the urgency of the notification, the notification system may determine a time during the day that she may be most likely to check emails and view notifications. For example, the notification system may determine that she likes to browse the internet and briefly glance through the most recent 20 or so emails based on social-networking webpage activity and 3rd party application data (e.g., an email application linked to her social-networking webpage). In addition, the notification system may determine that she usually likes to go to bed between 11:00-11:30 PM during the weekdays, and around 12:30 AM on the weekends, based on social-networking webpage activity, location data, mobile device data including usage of the device and interaction with certain applications (e.g., an alarm clock application). Thus, the notification system may determine that given her limited interaction with advertisement notifications by email, the most effective method of getting her to interact with the notification sent by email is to send the notification to her around 11:00 PM during the weekdays and around 12:00 AM on the weekends. In addition, the notification system may determine that Alice interacts with SMS messages including advertisements about 50% of the time, and clicks through links to content associated with the advertisement around 30% of the time. Thus, the notification system may determine that SMS messaging is another viable option to send notifications to her, but also may not have a high chance of user interaction.

The notification system may also determine that Alice has a big holiday party coming up on the calendar in two weeks based at least in part on her calendar information, social-networking activity (e.g., her acceptance of a social-networking invitation regarding the party, her comments or discussions with other users relating to the holiday party), email information, and recent internet and/or in-store shopping activity. In addition, the notification system may determine that she has previously purchased a nice dress at an upscale store prior to the big holiday party each year based on her social-networking information (e.g., previous posts or pictures of the dress on her social-networking webpage), location information, and credit card information. Thus, the notification system may determine that she may be shopping at upscale stores for dresses, and thus is more likely to visit MAXMARA also to do shopping. Thus, the notification system may determine that she may be very interested in the closeout sale at MAXMARA.

Based on these determinations, the notification system may determine that that Alice is very likely to interact with the notification of the MAXMARA sale and act upon the content of the notification of the message. Therefore, in step 440, given the urgency of the request, and given the high ranking of the notification, the context of the notification, and the historical data, the policy for sending her the notification may be to immediately send the notification to her telephone number via SMS but to wait until specified times to send the notification to her email address (e.g., 11:30 PM on weekdays and 12:30 AM on weekends) for maximum effectiveness of the notifications. In step 470, once the notification system receives an indication that Alice viewed the SMS message and clicked on the link to go to MAXMARA's webpage about the sale, the notification system may refrain from sending her the emails if she immediately makes a purchase.

In a fourth example, in step 410, the notification system may receive a promotional notification to be sent to a large group of users (e.g., a message broadcast to a predetermined group of shoppers) notifying them of a 10% off coupon at Bloomingdales for all women's coats and shoes.

In step 420, the notification system may determine that Alice often visits Stanford Mall, but does not typically visit Bloomingdales when at Stanford Mall based at least in part on her location information, her social-networking check-ins and posts, and her credit card information. In addition, the notification system may determine that it is now February in Palo Alto and that the weather has been in the high 70's in the past 3 weeks based at least in part on calendar information, local weather information, her location data, and her social-networking webpage data (e.g., her posts of how nice the weather has been, what kinds of shoes and clothes she has been wearing, etc.). Thus, the notification system may conclude that she may not be particularly interested in Bloomingdale's coupon for women's coats and shoes, and thus there may be low probability that she will interact with a notification including a Bloomingdale's coupon.

In addition, the notification system may determine that she is on vacation in Hawaii, and will be returning after the sale will be over based on her calendar information, location information, social-networking webpage information (e.g., posting pictures and/or updates of where she has been in Hawaii), and other social media information (e.g., information from TWITTER). In addition, in step 430, the notification system may determine that she rarely clicks on coupons of any kind from any vendor, based on her previously interactions of ignoring and/or actively deleting/blocking advertising notifications on her mobile device, and such information is determined based at least in part on the social-networking system's and the 3rd party system's data on her previous responses to advertisements. Thus, the notification system may conclude that it is highly unlikely that she will interact with the notification comprising the 10% off coupon from Bloomingdales.

Based on these determinations, the notification system may determine that there is a very low likelihood that Alice will interact with the notification comprising the coupon from Bloomingdales at all, and a very low likelihood that she will act upon the content of the notification. Therefore, given the lower ranking of the notification, the context of the notification, and the historical data, the notification system determines that no particular strategy will be helpful in increasing the likelihood of her interacting with the notification. In fact, based on the historical data, in step 440, the notification system may determine that she will generally ignore these notifications, and in some cases, will actively block some of these notifications relating to advertising (step 450). Thus, the policy for delivering this notification to her may be to simply send the message to her in the least distracting method (e.g., by displaying it only once in a newsfeed when she is logged into a social-networking application) and to not use any other media or send to any other endpoints associated with this user.

However, if (in step 470), information is received that Alice did in fact click on the link and purchase gift-wrapped children's clothing to be shipped to her brother's address, in step 480, the notification system may update the historical notification data and ranking scores with this new information.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for method for handling notification delivery in a user-aware manner including the particular steps of the method of FIG. 4, this disclosure contemplates any suitable method for method for handling notification delivery in a user-aware manner including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, the social-networking system may send notifications to increase the likelihood that the user will view certain stories that the user appears to have overlooked in their newsfeed. Such notifications may be sent only when a combined score based on the user's affinity with the story and the likely conversion score exceeds a particular threshold. In some embodiments, the social-networking system may periodically check whether the user has viewed a particular story, update the combined score for the story, then determine whether the notification should be sent (e.g., when the updated combined score exceeds threshold).

Figure 5:
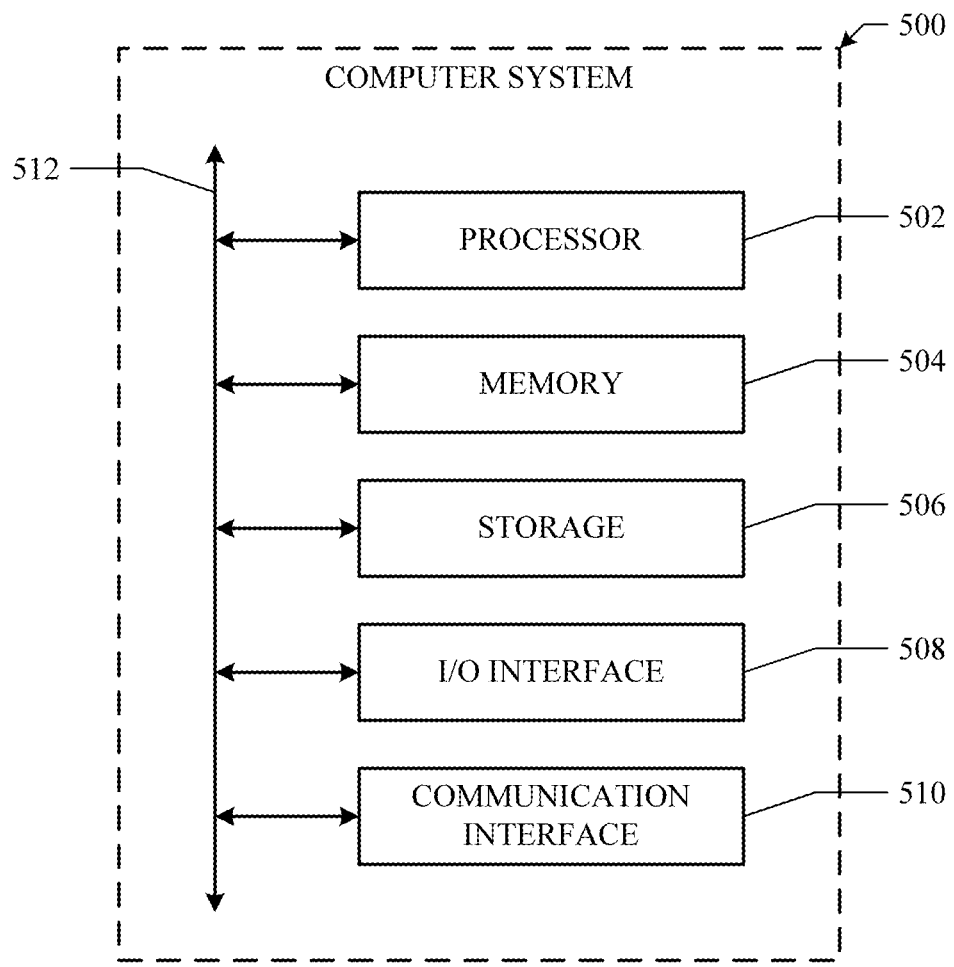
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by one or more server computing devices, accessing a notification to be sent to a client computing device, wherein the client computing device is one of a plurality of client computing devices associated with a user;
   by one or more server computing devices, determining a current delivery context of the user;
   by one or more server computing devices, retrieving historical notification data associated with the user with respect to the current delivery context of the notification, wherein the historical notification data comprises conversion scores associated with one or more available delivery channels to send the notification through, wherein a conversion score indicates a probability of the user interacting with the notification, and wherein a delivery channel comprises one or more uniquely-identified endpoint and one or more communication media;

by one or more server computing devices, ranking, based on the conversion scores, the one or more delivery channels;

by one or more server computing devices, determining a notification policy to apply to the notification based at least in part on the notification, the historical notification data, the conversion scores, or the current delivery context, wherein the notification policy specifies:
to which endpoint to send the notification to; or
a communication medium to send the notification through; and by one or more server computing devices, applying the notification policy to the notification to be sent to the client computing device.

2. The method of claim 1, wherein the history service continuously updates the historical notification data based on received information from the client computing device about interactions by the user with notifications sent to the user.

3. The method of claim 1, wherein the history service periodically:
updates a model for determining conversion scores for notifications based on the historical notification data; and
updates at least one notification policy based on the updated model.

4. The method of claim 3, wherein the model comprises a decision-tree model, further comprising:
determining, using the decision-tree model, the conversion scores.

5. The method of claim 1, wherein the determining the notification policy to apply to the notification further comprises:
retrieving, from a registration data store, information about one or more communication media registered for the user; or
retrieving, from a registration data store, information about one or more endpoints registered for the user.

6. The method of claim 5, wherein the determination of the notification policy to apply to the notification is further based on social-networking information of the user comprising:
a relationship between the user and the source of the notification; or
an affinity of the user for a user or entity associated with the content of the notification.

7. One or more computer-readable non-transitory storage media embodying software that is operable when executed to:
access a notification to be sent to a client computing device, wherein the client computing device is one of a plurality of client computing devices associated with a user;
determine a current delivery context of the user;
retrieve historical notification data associated with the user with respect to the current delivery context of the notification, wherein the historical notification data comprises conversion scores associated with one or more available delivery channels to send the notification through, wherein a conversion score indicates a probability of the user interacting with the notification, and wherein a delivery channel comprises one or more uniquely-identified endpoint and one or more communication media;

rank, based on the conversion scores, the one or more delivery channels;

determine a notification policy to apply to the notification based at least in part on the notification, the historical notification data, the conversion scores, or the current delivery context, wherein the notification policy specifies:
to which endpoint to send the notification to; or
a communication medium to send the notification through; and apply the notification policy to the notification to be sent to the client computing device.

8. The media of claim 7, wherein the history service continuously updates the historical notification data based on received information from the client computing device about interactions by the user with notifications sent to the user.

9. The media of claim 7, wherein the history service periodically:
updates a model for determining conversion scores for notifications based on the historical notification data; and
updates at least one notification policy based on the updated model.

10. The media of claim 9, wherein the model comprises a decision-tree model, the software comprising instructions operable when executed to:
determine, using the decision-tree model, the conversion scores.

11. The media of claim 7, wherein the instructions operable when executed to determine the notification policy to apply to the notification further comprise instructions operable when executed to:
retrieve, from a registration data store, information about one or more communication media registered for the user; or
retrieve, from a registration data store, information about one or more endpoints registered for the user.

12. The media of claim 11, wherein the determination of the notification policy to apply to the notification is further based on social-networking information of the user comprising:
a relationship between the user and the source of the notification; or
an affinity of the user for a user or entity associated with the content of the notification.

13. A system comprising: one or more processors; and a memory coupled to the processors comprising instructions executable by the processors, the processors being operable when executing the instructions to:
access a notification to be sent to a client computing device, wherein the client computing device is one of a plurality of client computing devices associated with a user;
determine a current delivery context of the user;
retrieve historical notification data associated with the user with respect to the current delivery context of the notification, wherein the historical notification data comprises conversion scores associated with one or more available delivery channels to send the notification through, wherein a conversion score indicates a probability of the user interacting with the notification, and wherein a delivery channel comprises one or more uniquely-identified endpoint and one or more communication media;

rank, based on the conversion scores, the one or more delivery channels;

determine a notification policy to apply to the notification based at least in part on the notification, the historical notification data, the conversion scores, or the current delivery context, wherein the notification policy specifies:
- to which endpoint to send the notification to; or
- a communication medium to send the notification through; and apply the notification policy to the notification to be sent to the client computing device.

14. The system of claim 13, wherein the history service continuously updates the historical notification data based on received information from the client computing device about interactions by the user with notifications sent to the user.

15. The system of claim 13, wherein the history service periodically:
- updates a model for determining conversion scores for notifications based on the historical notification data; and
- updates at least one notification policy based on the updated model.

16. The system of claim 15, wherein the model comprises a decision-tree model, the software comprising instructions operable when executed to:
- determine, using the decision-tree model, the conversion scores.

17. The system of claim 13, wherein the instructions operable when executed to determine the notification policy to apply to the notification further comprise instructions operable when executed to:
- retrieve, from a registration data store, information about one or more communication media registered for the user; or
- retrieve, from a registration data store, information about one or more endpoints registered for the user.

18. The system of claim 13, wherein the determination of the notification policy to apply to the notification is further based on social-networking information of the user comprising:
- a relationship between the user and the source of the notification; or
- an affinity of the user for a user or entity associated with the content of the notification.

* * * * *